US011066337B2

(12) United States Patent
Turcinskas et al.

(10) Patent No.: US 11,066,337 B2
(45) Date of Patent: Jul. 20, 2021

(54) INORGANIC FOAM BASED ON CALCIUM SULFOALUMINATE

(71) Applicants: Construction Research & Technology GmbH, Trostberg (DE); De Cavis AG, Dübendorf (CH)

(72) Inventors: Sarunas Turcinskas, Trostberg (DE); Bernhard Feichtenschlager, Trostberg (DE); Gerhard Albrecht, Trostberg (DE); Pauline Petit, Trostberg (DE); Urs Gonzenbach, Buchs (CH); Philip Sturzenegger, Greifensee (CH)

(73) Assignees: Construction Research & Technology GmbH, Trostberg (DE); De Cavis AG, Dübendorf (CH)

(*) Notice: Subject to any disclaimer, the term of this patent is extended or adjusted under 35 U.S.C. 154(b) by 85 days.

(21) Appl. No.: 16/489,872

(22) PCT Filed: Mar. 5, 2018

(86) PCT No.: PCT/EP2018/055292
§ 371 (c)(1),
(2) Date: Aug. 29, 2019

(87) PCT Pub. No.: WO2018/162381
PCT Pub. Date: Sep. 13, 2018

(65) Prior Publication Data
US 2020/0024201 A1  Jan. 23, 2020

(30) Foreign Application Priority Data

Mar. 6, 2017  (EP) .................................... 17159443

(51) Int. Cl.
*C04B 38/02* (2006.01)
*C04B 7/02* (2006.01)
(Continued)

(52) U.S. Cl.
CPC ................ *C04B 38/02* (2013.01); *C04B 7/02* (2013.01); *C04B 12/04* (2013.01); *C04B 14/041* (2013.01);
(Continued)

(58) Field of Classification Search
CPC .......... C04B 38/02; C04B 7/02; C04B 12/04; C04B 14/041; C04B 14/106; C04B 14/28;
(Continued)

(56) References Cited

U.S. PATENT DOCUMENTS

| 4,349,386 A | 9/1982 | Davidovits |
| 4,472,199 A | 9/1984 | Davidovits |

(Continued)

FOREIGN PATENT DOCUMENTS

| CN | 105 645 887 A | 6/2016 | |
| CN | 105645887 A * | 6/2016 | ............. C04B 28/06 |

(Continued)

OTHER PUBLICATIONS

Tian et al. Utilization of original phosphogypsum for the preparation of foam concrete. Construction and Building Materials vol. 115, Jul. 15, 2016, pp. 143-152.*

(Continued)

*Primary Examiner* — Noah S Wiese
(74) *Attorney, Agent, or Firm* — Curatolo Sidoti Co., LPA; Salvatore A Sidoti; Floyd Trillis, III

(57) ABSTRACT

The present invention relates to a process for preparing a particle-stabilized inorganic foam based on calcium sulfoaluminate, to a particle-stabilized inorganic foam based on calcium sulfoaluminate, to a cellular material obtainable by hardening and optionally drying the particle-stabilized inorganic foam based on calcium sulfoaluminate, and to a (Continued)

Figure 1:
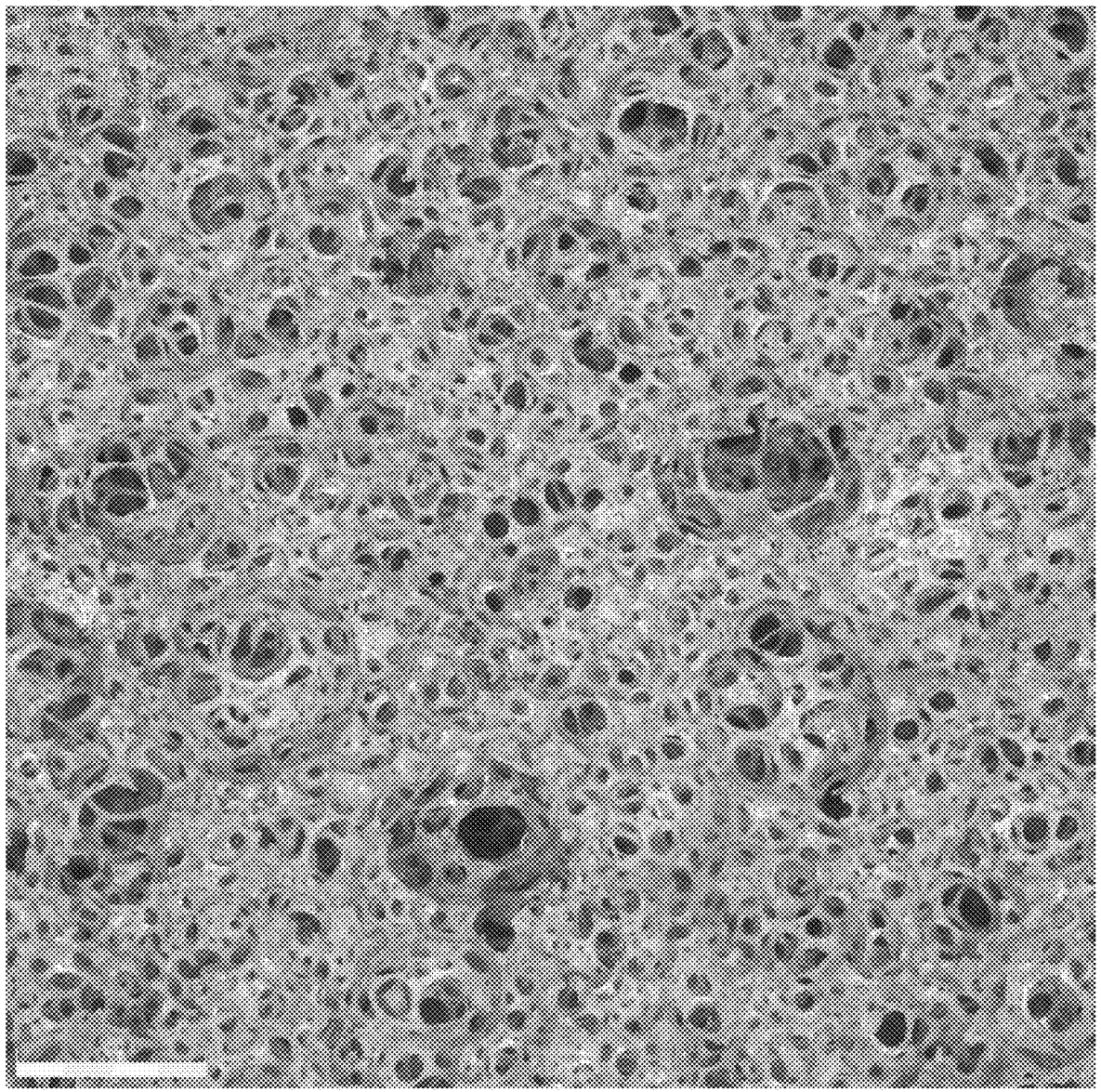

composition for preparing an inorganic foam formulation for providing a particle-stabilized inorganic foam based on calcium sulfoaluminate.

22 Claims, 4 Drawing Sheets

(51) Int. Cl.
| | |
|---|---|
| C04B 12/04 | (2006.01) |
| C04B 14/04 | (2006.01) |
| C04B 14/10 | (2006.01) |
| C04B 14/28 | (2006.01) |
| C04B 14/30 | (2006.01) |
| C04B 14/32 | (2006.01) |
| C04B 16/06 | (2006.01) |
| C04B 18/08 | (2006.01) |
| C04B 18/14 | (2006.01) |
| C04B 20/00 | (2006.01) |
| C04B 22/06 | (2006.01) |
| C04B 22/14 | (2006.01) |
| C04B 24/00 | (2006.01) |
| C04B 24/02 | (2006.01) |
| C04B 24/04 | (2006.01) |
| C04B 24/12 | (2006.01) |
| C04B 24/16 | (2006.01) |
| C04B 28/06 | (2006.01) |
| C04B 103/00 | (2006.01) |
| C04B 103/12 | (2006.01) |
| C04B 103/22 | (2006.01) |
| C04B 103/32 | (2006.01) |
| C04B 103/40 | (2006.01) |
| C04B 103/44 | (2006.01) |
| C04B 103/65 | (2006.01) |

(52) U.S. Cl.
CPC ........... *C04B 14/106* (2013.01); *C04B 14/28* (2013.01); *C04B 14/30* (2013.01); *C04B 14/32* (2013.01); *C04B 16/0658* (2013.01); *C04B 18/08* (2013.01); *C04B 18/141* (2013.01); *C04B 18/146* (2013.01); *C04B 20/0048* (2013.01); *C04B 22/068* (2013.01); *C04B 22/143* (2013.01); *C04B 24/003* (2013.01); *C04B 24/02* (2013.01); *C04B 24/04* (2013.01); *C04B 24/124* (2013.01); *C04B 24/16* (2013.01); *C04B 28/065* (2013.01); *C04B 2103/0088* (2013.01); *C04B 2103/0094* (2013.01); *C04B 2103/12* (2013.01); *C04B 2103/22* (2013.01); *C04B 2103/32* (2013.01); *C04B 2103/40* (2013.01); *C04B 2103/44* (2013.01); *C04B 2103/65* (2013.01); *C04B 2235/5418* (2013.01)

(58) Field of Classification Search
CPC ....... C04B 14/30; C04B 18/08; C04B 18/141; C04B 22/068; C04B 22/143; C04B 24/003; C04B 28/065; C04B 2235/5418
See application file for complete search history.

(56) References Cited

U.S. PATENT DOCUMENTS

| | | |
|---|---|---|
| 9,540,287 B2 | 1/2017 | Aldabaibeh et al. |
| 2009/0325780 A1 | 12/2009 | Gauckler et al. |
| 2010/0010139 A1 | 1/2010 | Davidovits et al. |
| 2014/0272376 A1 | 9/2014 | Aldabaibeh et al. |
| 2016/0214891 A1* | 7/2016 | Bullerjahn ............ C04B 28/065 |

FOREIGN PATENT DOCUMENTS

| | | |
|---|---|---|
| DE | 10 2014 103258 A1 | 9/2015 |
| WO | WO 85/03699 A1 | 9/1985 |
| WO | WO 2007/068127 A1 | 6/2007 |

OTHER PUBLICATIONS

Lyu et al. Utilisation of propyl gallate as a novel selective collector for diaspore flotation. Minerals Engineering 131 (2019) p. 66-72.*
European Search Report for European Patent Application No. 17159443.5, dated Sep. 11, 2017.
International Search Report for corresponding PCT Patent Application No. PCT/EP2018/055292, dated May 11, 2018.
International Written Opinion for corresponding PCT Patent Application No. PCT/EP2018/055292, dated May 11, 2018.
International Preliminary Report on Patentability for corresponding PCT Patent Application No. PCT/EP2018/055292, dated Sep. 10, 2019.
Franziska Kraus Juillerat, et al., "Microstructural Control of Self-Setting Particle-Stabilized Ceramic Foams", Journal of the American Ceramic Society, vol. 94, Issue 1, Jan. 2011, pp. 77-83.

* cited by examiner

INORGANIC FOAM BASED ON CALCIUM SULFOALUMINATE

CROSS REFERENCE TO RELATED APPLICATIONS

This application is a national stage application of International Application No. PCT/EP2018/055292, filed 5 Mar. 2018, which claims priority from European Patent Application No. 17159443.5, filed 6 Mar. 2017, which applications are incorporated herein by reference.

The present invention relates to a process for preparing a particle-stabilized inorganic foam based on calcium sulfoaluminate, to a particle-stabilized inorganic foam based on calcium sulfoaluminate, to a cellular material obtainable by hardening and optionally drying the particle-stabilized inorganic foam based on calcium sulfoaluminate, and to a composition for preparing an inorganic foam formulation for providing a particle-stabilized inorganic foam based on calcium sulfoaluminate.

Inorganic foams can be used as insulation material, e.g., as a thermal insulator, acoustic insulator or acoustic absorber as well as construction material with a low density. In contrast to foams based on organic polymers, this material is eco-friendly, robust, and non-flammable. The latter may also open up applications in the field of fire protection. Foams in general can be stabilized by use of surfactants or particles. Inorganic foams stabilized by surfactants typically have an open-cell foam structure. However, of particular interest are closed cell foams, as they have improved thermal insulation properties that go along with improved mechanical stability.

It has been found that stable inorganic foams with a closed-cell foam structure can be obtained by using inorganic particles as foam stabilizers. Typically, the presence of amphiphilic molecules is required to initiate surface activity of the used particles. WO 2007/068127 A1 discloses the stabilization of wet foams by colloidal particles, e.g., in combination with propyl gallate. Juillerat et al. (F. K. Juillerat, U. T. Gonzenbach, P. Elser, A. R. Studart, L. J. Gauckler, J. Am. Ceram. Soc. 2011, 94, 77-83) disclose the stabilization of ceramic foams by colloidal $Al_2O_3$ particles that are partially hydrophobized by adsorption of propyl gallate molecules. U.S. Pat. No. 9,540,287 B2 discloses the use of propyl gallate molecules in combination with cementitious particles to stabilize foamed cementitious slurries. According to DE 102014103258 A1, a gypsum inorganic foam can be stabilized by inorganic particles in combination with amphiphilic molecules, such as heptyl amine.

Of particular interest are inorganic foams based on activated aluminosilicates (geopolymers) as non-flammable insulation materials. It has been found that particle-stabilized closed-cell geopolymer foams have advantageous properties in particular with regard to the dry density, the compressive strength and the air flow resistance in comparison to surfactant-stabilized closed-cell geopolymer foams. At the same time, a comparable thermal conductivity can be provided. However, particle-stabilized closed-cell geopolymer foams require a high pH value of about 14 for the setting, which causes problems in terms of the safety and handling. Furthermore, the raw material costs of geopolymer foams are rather high.

Accordingly, it was an object of the present invention to provide closed-cell inorganic foams with comparable or improved properties in comparison to geopolymer foams, but to ensure at the same time that the process of preparing the same does not require such a high pH value.

Furthermore, it was an object of the present invention to provide such an inorganic foam at lower raw material costs, In particular, it was an object to provide inorganic foams, which exhibit a satisfying thermal conductivity combined with high compressive strength at a low dry density, and a safe process for preparing such inorganic foams. In addition, it was also an object to increase the air flow resistance of the inorganic foams in comparison to geopolymer foams.

It has surprisingly been found that the above objects can be achieved by the present invention, which is described hereinafter. In particular, it has been discovered that by combining (i) at least one group of inorganic particles, (ii) at least one amphiphilic compound, and (iii) at least one inorganic binder mixture comprising at least one calcium sulfoaluminate mixture, and optionally at least one further inorganic binder selected from the group consisting of hydraulic binders, latent hydraulic binders, pozzolanic binders, and mixtures thereof, inorganic foams can be obtained without intermediately forming an inorganic foam formulation with a high pH-value. Instead, the pH value of the inorganic foam formulation may be kept below 12, which is an advantage in terms of the safety and regulatory hurdles and in terms of additive compatibility (e.g. plastizisers) to the inorganic foam formulation. As a result, stable inorganic foams with a fine and homogeneous closed-cell structures are obtained. Furthermore, the inorganic foams of the invention exhibit a satisfying thermal conductivity combined with high compressive strength at a low dry density as well as a very high air flow resistance.

In one embodiment, the present invention relates to a process for preparing an inorganic foam comprising the steps of)
(1) Mixing
  (i) at least one group of inorganic particles;
  (ii) at least one amphiphilic compound;
  (iii) at least one inorganic binder mixture comprising
    (iiia) at least one calcium sulfoaluminate mixture, and optionally
    (iiib) at least one further inorganic binder selected from the group consisting of hydraulic binders, latent hydraulic binders, pozzolanic binders, and mixtures thereof;
  (iv) water; and optionally
  (v) at least one additive; and
(2) foaming the resulting foam formulation by chemical, physical or mechanical foaming.

CN105645887A discloses a high-efficiency constructional flame retardation fiber material that is prepared from, by weight, 7-13 parts of a flame retardation synergistic agent antimony oxide, 4-8 parts of kaolin, 0.7-1.6 parts of an antiseptic, 10-14 parts of fly ash, 4-7 parts of wheat straw pulp, 10-20 parts of ramie fibers, 3-5 parts of straw charcoal, 8-13 parts of secondary alcohol ethoxylate, 0.5-1.2 parts of cetyltrimethylammonium bromide, 2-4 parts of an antioxidant, 0.8-1.4 parts of a flexibilizer, 4-7 parts of epoxypropyl methacrylate, 0.3-0.6 parts of propyl gallate, 2-4 parts of calcium oxide, 0.5-1.4 parts of paraffin, 18-26 parts of foamed sulfoaluminate cement, 3-5 parts of a lithium base curing agent, 4-6 parts of a composite stabilizer, and 7-13 parts of calcium carbonate. In contrast thereto, the present invention does not use foamed sulfoaluminate cement. The entire foam formulation of the present invention is rather foamed afterwards by chemical, physical or mechanical foaming.

US 2014/0272376 A1 discloses a slurry for forming a product, the slurry comprising: (a) water; (b) cementitious particles; (c) air bubbles with walls formed by the water and (d) surface modifying agent effective to modify a surface of at least some of the cementitious particles, such that the modified particles stabilize the air bubbles sufficiently to form air voids in the product. The cementitious particles are said to comprise stucco, calcium sulfate dihydrate, Portland cement, fly ash, or combinations thereof. In contrast thereto, the present invention does not use cementitious systems as defined in US 2014/0272376 A1.

In another embodiment, the present invention relates to an inorganic foam obtainable by the process of the present invention.

In yet another embodiment, the present invention relates to an inorganic foam comprising
- (i) the at least one group of inorganic particles;
- (ii) the at least one amphiphilic compound;
- (iii) the at least one inorganic binder mixture comprising
  - (iiia) at least one calcium sulfoaluminate mixture, and optionally
  - (iiib) at least one further inorganic binder selected from the group consisting of hydraulic binders, latent hydraulic binders, pozzolanic binders, and mixtures thereof.
- (iv) water; and optionally
- (v) the at least one additive.

In yet another embodiment, the present invention relates to a cellular material obtainable by hardening and optionally drying an inorganic foam as defined herein.

In yet another embodiment, the present invention relates to a composition for preparing an inorganic foam formulation comprising as components
- (i) the at least one group of inorganic particles;
- (ii) the at least one amphiphilic compound;
- (iii) the at least one inorganic binder mixture comprising
  - (iiia) at least one calcium sulfoaluminate mixture, and optionally
  - (iiib) at least one further inorganic binder selected from the group consisting of hydraulic binders, latent hydraulic binders, pozzolanic binders, and mixtures thereof;
  wherein
  the components (i), (ii), and (iii) are present separately; or
  the components (i) and (ii) are present as a mixture and component (iii) is present separately; or
  the components (i), (ii) and (iii) are present as a mixture.

Figure 2:
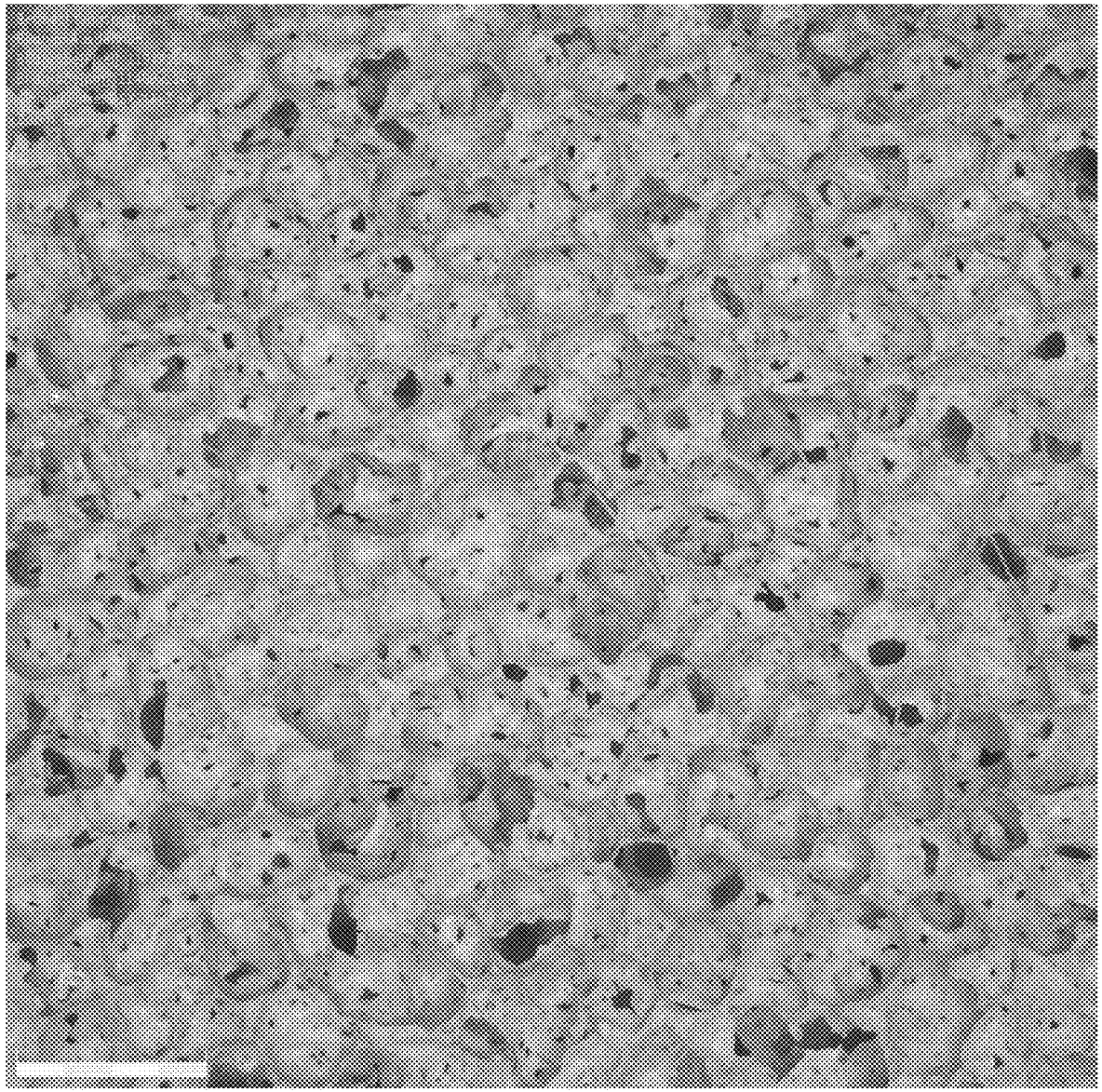
Figure 3:
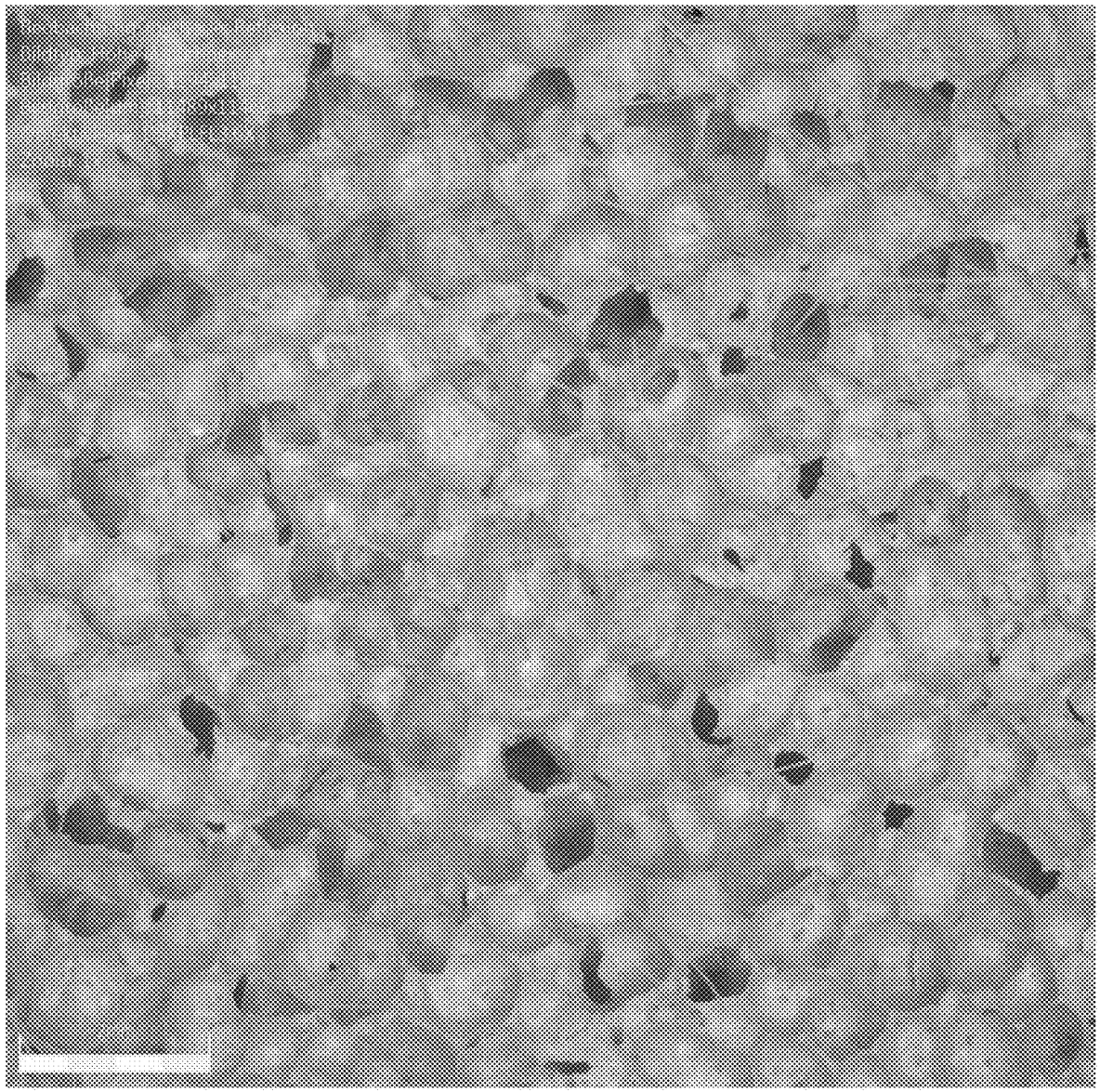
Figure 4:
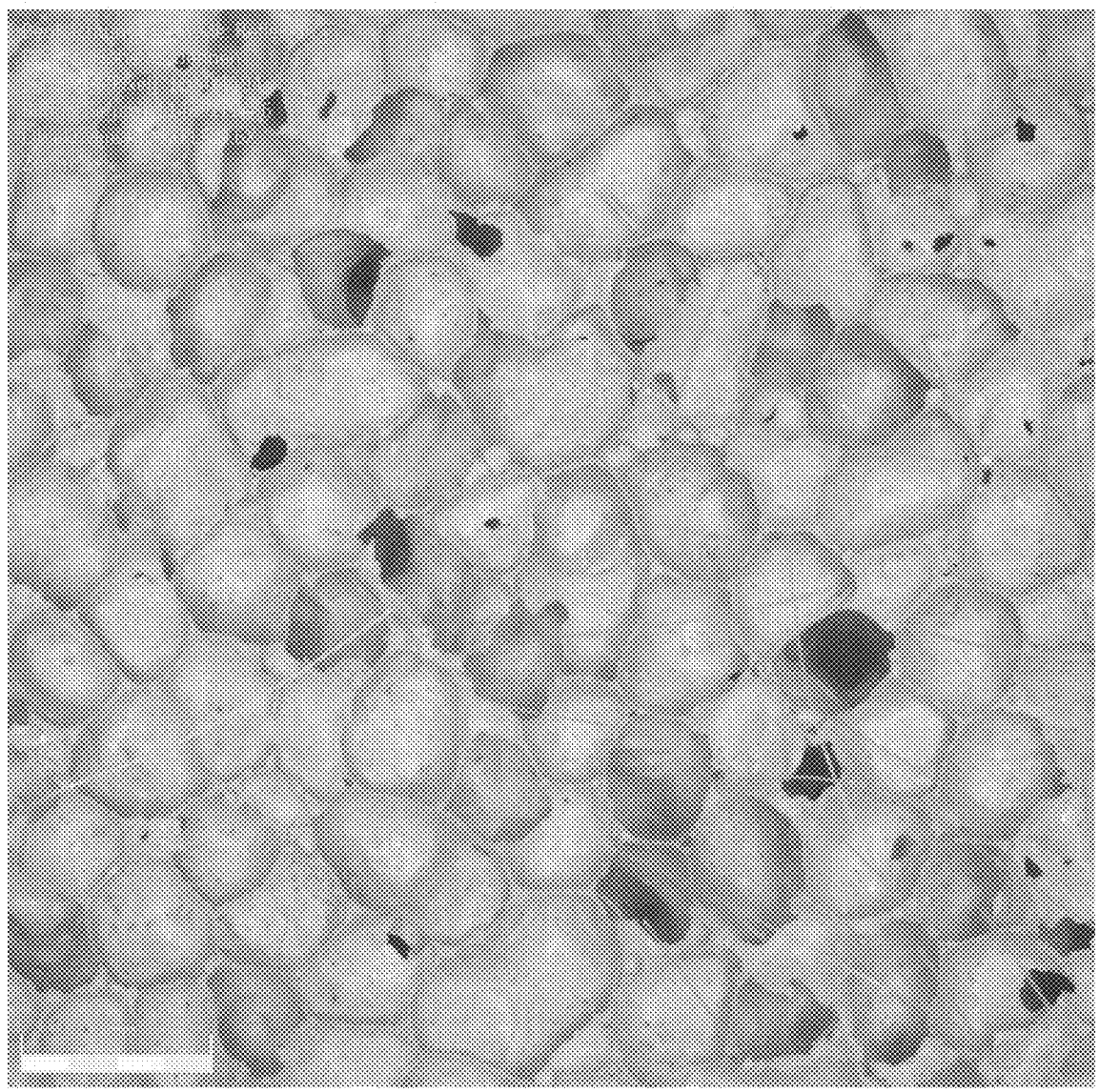

The present invention is further illustrated by FIGS. 1, 2, 3 and 4. FIG. 1 is provided for comparative purposes and shows a picture of a surfactant-stabilized geopolymer foam with an open-cell structure. FIG. 2 is also provided for comparative purposes and shows a picture of a particle-stabilized geopolymer foam with a mainly closed-cell structure. FIG. 3 shows a picture of a particle-stabilized inorganic foam according to the present invention, wherein the inorganic binder mixture comprises only a calcium sulfoaluminate mixture, and no further inorganic binders. FIG. 4 shows a picture of a particle-stabilized inorganic foam according to the present invention, wherein the inorganic binder mixture comprises a calcium sulfoaluminate mixture and a mixture of metakaolin and fly ash as further inorganic binders. In all Figures the scale bar on the lower left side is 2 mm.

The following definitions are relevant in connection with the embodiments of the present invention.

The term "about" in respect to a measurable unit refers to normal deviations of said measurable unit. Such deviations depend on the precision of the measuring apparatus or they depend on statistical deviations that are expected by the skilled person. It is to be understood that the term "about" means a deviation of ±15%, preferably ±10%, more preferably ±5%.

The term "wt.-%" refers to the ratio of the mass of the respective component in relation to the sum of the mass of all components except water in percent, if not stated otherwise. The term vol.-% refers to the ratio of the volume of the respective component in relation to the sum of the volume of all components in percent.

The meaning of the term "comprising" is to be interpreted as encompassing all the specifically mentioned features as well optional, additional, unspecified ones, whereas the term "consisting of" only includes those features as specified. It is moreover intended that in each actual case the sum of all of the percentages of the specified and unspecified constituents of the formulation of the invention is always 100%.

In the context of the process for preparing an inorganic foam, the inorganic foam, the cellular material obtainable by hardening and optionally drying the inorganic foam, and the composition for preparing an inorganic foam formulation according to the present invention, the following definitions are relevant.

In general, it is distinguished between the terms "inorganic foam formulation" and "inorganic foam". The inorganic foam formulation may be obtained from a suitable composition for preparing an inorganic foam formulation as defined herein by adding water and optionally at least one additive. The inorganic foam formulation may then be used to prepare an inorganic foam by mechanical, physical or chemical foaming. The freshly prepared inorganic foam is to be distinguished from the hardened inorganic foam, i.e. the cellular material, which is obtainable from the freshly prepared inorganic foam by hardening and optionally drying. Unless otherwise indicated, the term "inorganic foam" as used herein refers to the freshly prepared inorganic foam, and the term "cellular material" refers to the hardened and optionally dried inorganic foam.

Inorganic foams are three-phase systems, wherein one phase is gaseous, one phase is liquid, and one phase is solid. Thus, it is to be understood that the inorganic foam comprises a gas. The gaseous phase is present as fine gas bubbles separated by cell walls obtained from the liquid and solid phases. The cell walls meet each other at edges which meet each other at nodes, thereby forming a framework. The content of the gaseous phase in the inorganic foam may vary in a range of from 20 to 99%, preferably from 50 to 98% by volume. The liquid phase is preferably an aqueous phase, so that the inorganic foam typically also comprises water. However, the water may be partly removed upon drying. The solid phase of an inorganic foam comprises an inorganic binder. Inorganic foams can be open-cell foams or closed-cell foams. In closed-cell foams, the gas is completely surrounded by the cell wall. Typically, at the same density, closed-cell foams are more robust than open-cell foams. Accordingly, closed cell foams are preferred due to their improved mechanical stability.

Cellular materials can be obtained from inorganic foams by hardening and optionally drying an inorganic foam.

Water as denoted herein, can refer to pure, deionized $H_2O$, or water containing up to 0.1 wt.-% impurities and/or salts, such as normal tap water.

The gas phase present in the foam can be introduced by mechanical, physical or chemical foaming. Non-limiting examples of gases comprise air, nitrogen, noble gas, carbon dioxide, hydrocarbons, hydrogen, oxygen, and mixtures thereof.

The gas phase present in the foam can be introduced by mechanical foaming in the presence of the respective gas. Mechanical foaming may be performed for example by using a mixer, or by an oscillating process, or by a stator-rotor process.

The gas phase can also be introduced into the foam by physical or chemical foaming, wherein the physical or chemical foaming process is suitable to liberate a gas. Preferably, blowing agents are used, which evaporate, decompose or react with water and/or an acid, so as to liberate the gas. Non-limiting examples of blowing agents are peroxides, such as hydrogen peroxide, dibenzylperoxide, peroxobenzoic acid, peroxoacetic acid, alkali metal peroxides, perchloric acid, peroxomonosulfuric acid, dicumyl peroxide or cumyl hydroperoxide; isocyanates, carbonates and bicarbonates, such as $CaCO_3$, $Na_2CO_3$, and $NaHCO_3$, which are preferably used in combination with an acid, e.g., a mineral acid; metal powders, such as aluminum powder; azides, such as methyl azide; hydrazides, such as p-toluenesulfonylhydrazide; hydrazine.

Chemical foaming can be facilitated by the use of a catalyst. Suitable catalysts preferably comprise $Mn^{2+}$, $Mn^{4+}$, $Mn^{7+}$ or $Fe^{3+}$ cations. Alternatively, the enzyme catalase may be used as catalyst. Non-limiting examples of suitable catalysts are $MnO_2$ and $KMnO_4$. Such catalysts are preferably used in combination with peroxide blowing agents.

Further details regarding the components as used in the process for preparing an inorganic foam, the inorganic foam, the cellular material obtainable by hardening and optionally drying the inorganic foam, and the composition for preparing an inorganic foam formulation according to the present invention, are provided hereinafter.

The term "inorganic particles" as used herein preferably refers to inorganic particles selected from the group consisting of:
  Oxides, including pure and mixed metal oxides (particularly aluminum oxide, silicon dioxide, spinels, cerium-gadoliniumoxide, zirconium oxide, magnesium oxide, tin oxide, titanium oxide and cerium oxide);
  Hydroxides (particularly aluminum hydroxide, calcium hydroxide, magnesium hydroxide, very particularly aluminum hydroxide);
  Carbides (particularly silicon carbide, boron carbide);
  Nitrides (particularly silicon nitride, boron nitride);
  Phosphates (particularly calcium phosphates, such as tri-calciumphospha.e, hydroxyapatite);
  Carbonates (particularly nickel carbonate, calcium carbonate (ground limestone or precipitated calcium carbonate), magnesium carbonate);
  Silicates (particularly silicon dioxide, silica fume, fly ash, quartz, ground glasses, slag, calcium silicates, mullite, cordierite, clay minerals like kaolin or bentonite, zirconium silicate, zeolites, diatomaceous earth, very particularly silica fume, clay minerals, zirconium silicate; specifically clay minerals);
  Sulfates (particularly calcium sulfate).

It has to be understood that the inorganic particles (i) as exemplified hereinabove are not identical to the inorganic binders iiia and/or iiib.

Preferably, the inorganic particles are obtained from carbonates and/or oxides. Preferred oxides include pure and mixed metal oxides, selected from the group consisting of aluminum oxides (including Al-Mg spinels), silicon dioxides, zirconium dioxides, and zinc oxides, particularly aluminum oxide, silicon dioxide, and zirconium dioxide. A preferred carbonate is calcium carbonate.

The term "group of inorganic particles" as used herein is to be understood as a plurality if inorganic particles of one kind. It is also to be understood that at least one, i.e. one or more groups, of inorganic particles may be used according to the invention, which means that also various mixtures of the above defined inorganic particles are possible.

Thus, in a preferred embodiment of the invention, the at least one group of inorganic particles is selected from the group consisting of oxides, hydroxides, carbides, nitrides, phosphates, carbonates, silicates, sulfates, and mixtures thereof.

In a more preferred embodiment, the at least one group of inorganic particles is selected from the group consisting of silica particles, alumina particles, zirconia particles, and $CaCO_3$ particles and mixtures thereof.

The particle size of the at least one group of inorganic particles may vary within a broad range. For powders (primary particles), suitable median particle sizes $D_{50}$ range from 30 nm to 300 µm, preferably from 100 nm to 250 µm, more preferably from 100 nm to 150 µm, even more preferably from 100 nm to 100 µm. In a further embodiment, suitable particle sizes range from 100 nm to 10 µm, preferably 100 nm to 2 µm, It was found that the particle size distribution is of less importance. Good foams can be obtained with narrow as well as with broad particle size distributions.

In a preferred embodiment of the invention, the at least one group of inorganic particles has a median particle size $D_{50}$ measured by dynamic light scattering in the range of from 30 nm to 300 µm.

The term "particle size $(D_x)$" refers to the diameter of a particle distribution, wherein x % of the particles have a smaller diameter. The $D_{50}$ particle size is thus the median particle size. The $D_x$ particle size can e.g. be measured by laser diffraction or dynamic light scattering (DLS) methods. According to the present invention dynamic light scattering (DLS) according to ISO 22412:2008 is preferably used. Dynamic light scattering (DLS), sometimes referred to as Quasi-Elastic Light Scattering (QELS), is a non-invasive, well-established technique for measuring the size and size distribution of molecules and particles typically in the submicron region. In the present invention the particles were characterized, which have been dispersed in a liquid, preferably water or ethanol. The Brownian motion of particles or molecules in suspension causes laser light to be scattered at different intensities. Analysis of these intensity fluctuations yields the velocity of the Brownian motion and hence the particle size using the Stokes-Einstein relationship. The distribution can be a volume distribution $(D_v)$, a surface distribution $(D_s)$, or a number distribution $(D_n)$. In context of this application, the $D_x$ value refers to a number distribution, wherein x(number) % of the particles have a smaller diameter.

The term "amphiphilic compound" is known in the art and relates to organic compounds having an apolar part (also identified as tail or group R) and a polar part (also identified as head group). Accordingly, suitable amphiphilic molecules contain a tail coupled to a head group, typically by covalent bonds. Such amphiphilic molecules typically contain one tail and one head group, but may also contain more than one head group.

The tail can be aliphatic (linear or branched) or cyclic (alicyclic or aromatic) and can carry substituents. Such substituents are e.g. with —$C_nH_{2n-30\ 1}$ with n≤8, secondary —OH, secondary —$NH_2$, etc. Preferred tails are optionally substituted linear carbon chains of 2 to 8 carbon atoms, more preferably linear carbon chains of 3 to 8, 4 to 8 or 5 to 8 carbon atoms. Throughout the present specification, "secondary —OH" and "secondary —NH$_2$" shall mean that the resulting substituted tail group constitutes a secondary alcohol or a secondary amine.

The head groups that are coupled to the tail preferably are ionic groups, ionizable groups and/or polar groups. Examples of possible head groups and corresponding salts are specified in Table 1 below (wherein the tail is designated as R).

TABLE 1

| | |
|---|---|
| phosphates<br>X: H, C$_n$H$_{2n+1}$ (n < 7), alkali metals | HO—P(=O)(OX)—OR |
| phosphonates<br>X: H, C$_n$H$_{2n+1}$ (n < 7), alkali metals | HO—P(=O)(OX)—R |
| sulfates | HO—S(=O)$_2$—OR |
| sulfonates | HO—S(=O)$_2$—R |
| alcohols | R—OH |
| amines X: H, C$_n$H$_{2n+1}$ (n < 7) | X—N(X)—R |
| amides | R—C(=O)—NH$_2$ |
| pyrroldines | N-H pyrrolidine with R substituent |
| gallates | 3,4,5-trihydroxybenzoate ester —C(=O)OR |
| carboxylic acids | R—C(=O)OH |

Preferred head groups are selected from carboxylic acid groups, gallates, amines and sulfonates. Particularly preferred head groups are selected from carboxylic acid groups (i.e. —C(O)OH groups), gallates and amine groups where X preferably represents H or methyl. A preferred carboxylic acid is enanthic acid (heptanoic acid). A preferred gallate is butyl gallate. A preferred amine is heptylamine. Carboxylic acid groups are most preferred.

Preferably, the amphiphilic molecules reduce the surface tension of an air-water interface to values lower than or equal to 65 mN/m for concentrations lower than or equal to 0.5 mol/l.

Preferably, amphiphilic molecules have a critical micelle concentration (CMC) higher than 10 µmol/l and/or they have a solubility higher than 1 µmol/l.

It is to be understood that at least one, i.e. one or more members of amphiphilic compounds may be used according to the invention, which means that also various mixtures of the above defined amphiphilic compounds are possible.

Thus, in a preferred embodiment of the invention, the at least one amphiphilic compound comprises amphiphilic compounds with at least one polar head group and at least one apolar tail group, wherein the at least one head group is selected from the group consisting of phosphates, phophonates, sulfates, sulfonates, alcohols, amines, amides, pyrrolidines, gallates, and carboxylic acids;

and wherein the at least one tail group is selected from an aliphatic or an aromatic or a cyclic group with 2 to 8 carbon atoms, wherein the carbon atoms are optionally substituted with one or more, same or different bstitu selected from C$_1$-C$_8$-alkyl, secondary —OH, and secondary —NH$_2$.

In a more preferred embodiment of the invention, the at least one amphiphilic compound comprises amphiphilic compounds with at least one head group selected from the group consisting of carboxylic acids, gallates and amines, and at least one tail group selected from aliphatic groups with 2 to 8 carbon atoms.

It is to be understood that upon combining the inorganic particles as defined herein with the amphiphilic compounds as defined herein hydrophobized inorganic particles are formed. The term "hydrophobized inorganic particles" relates to inorganic particles, wherein the particle's surface is modified with amphiphilic molecules, so as to reduce the hydrophilic properties of the inorganic particle. Surface modification in this context means that the amphiphilic compounds are adsorbed on the particle's surface.

In a preferred embodiment, the amount of amphiphilic compound to inorganic particle surface is from 0.5 to 160 µmol/m$^2$, preferably from 10 to 140 µmol/m$^2$, more preferably from 20 to 120 µmol/m$^2$ and in particular from 40 to 100 µmol/m$^2$. In another preferred embodiment, the inorganic particles are provided in an amount of from 0.1 to 25 wt.-% with regard to the amount of the at least one inorganic binder mixture, preferably 0.25 to 15 wt.-%, more preferably 0.5 to 15 wt.-% and in particular 1 to 15 wt.-%.

The hydrophobized inorganic particles are suitable for stabilizing inorganic foams based on the inorganic binder mixture as defined herein, In a preferred embodiment, the weight ratio of water to inorganic binder mixture in the foam formulation is from 0.1 to 2.0, preferably from 0.2 to 1.5, more preferably from 0.3 to 1.2, and in particular from 0.3 to 1.

Inorganic binders are inorganic compounds that harden in an aqueous environment (hydraulic) or in the presence of air (non-hydraulic). For example, Portland cement is a hydraulic inorganic binder, whereas gypsum is a non-hydraulic binder. A latent hydraulic binder refers to a binder that only becomes hydraulic when exposed to an alkaline activator.

In the context of the present invention an inorganic binder mixture (iii) is used, which comprises at least one calcium sulfoaluminate mixture (iiia), and optionally at least one further inorganic binder (iiib) selected from the group consisting of hydraulic binders, latent hydraulic binders, pozzolanic binders, and mixtures thereof.

The at least one inorganic binder mixture according to the present invention comprises at least one calcium sulfoaluminate mixture (iiia). The term "calcium sulfoaluminate mixture" refers to a mixture which, upon contact with water, can form a calcium sulfoaluminate phase such as ettringite $((CaO)_3(Al_2O_3)(CaSO_4)_3.30\text{-}32H_2O)$.

Such calcium sulfoaluminate mixture may contain e.g.:
a) ye'elimite $(4CaO \times 3Al_2O_3 \times SO_3)$ and optionally belite $(2CaO \times SiO_2)$, and b) anhydrite $(CaSO_4)$ and/or calcium sulfate hemihydrate $(CaSO_4 \times 0.5\ H_2O)$ and/or gypsum $(CaSO_4 \times 2\ H_2O)$,
in a weight ratio of a):b) of from 90:10 to 60:40, preferably 80:20 to 65:35.

The calcium sulfoaluminate mixture has a typical analytical oxide composition of about:
5 to 35 wt.-% of $SO_3$
30 to 60 wt.-% of CaO
0 to 30 wt.-% of $SiO_2$
5 to 35 wt.-% of $Al_2O_3$,
preferably
10 to 30 wt.-% of $SO_3$
30 to 50 wt.-% of CaO
0 to 20 wt.-% of $SiO_2$
15 to 35 wt.-% of $Al_2O_3$,
and more preferably
17 to 27 wt.-% of $SO_3$
37 to 47 wt.-% of CaO
5 to 15 wt.-% of $SiO_2$
20 to 30 wt.-% of $Al_2O_3$.

The at least one inorganic binder mixture according to the present invention may optionally additionally comprise at least one further inorganic binder (iiib) selected from the group consisting of hydraulic binders, latent hydraulic binders, pozzolanic binders, and mixtures thereof.

The terms "latent hydraulic binder" and "pozzolanic binder" refer to inorganic binder systems termed inter alia "geopolymers". Geopolymers are described by way of example in U.S. Pat. No. 4,349,386, WO 85/03699 and U.S. Pat. No. 4,472,199.

Geopolymers are binders that are primarily based on $SiO_2$ and/or $Al_2O_3$, such as poly(sialate), poly(siloxo), poly(sialate-siloxo), or poly(sialate-disiloxo), which harden in alkaline aqueous environment. Sialate is an abbreviation for silicon-oxo-aluminum. Geopolymers material is similar to zeolite, however, the microstructure is amorphous and not crystalline. These binders may also contain compounds based on $Fe_2O_3$, $TiO_2$, CaO, MgO, NaO, or $K_2O$. Pure geopolymers generally have a low calcium content. WO 2011/064005 A1 describes an inorganic binder system which comprises from 12 to 25% by weight of CaO, and which permits production of construction chemical products that are resistant to chemical attack. Further non-limiting examples of geopolymers comprise microsilica, metakaolin, aluminosilicates, fly ash, activated clay, pozzolans, or mixtures thereof. Pozzolans are siliceous or siliceous and aluminous containing compounds.

For the purposes of the present invention, a "latent hydraulic binder" is preferably a binder in which the molar ratio $(CaO+MgO):SiO_2$ is from 0.8 to 2.5 and particularly from 1.0 to 2.0. In general terms, the above-mentioned latent hydraulic binders can be selected from industrial and/or synthetic slag, in particular from blast furnace slag, electrothermal phosphorous slag, steel slag and mixtures thereof, and the "pozzolanic binders" can generally be selected from amorphous silica, preferably precipitated silica, fumed silica and microsilica, ground glass, metakaolin, aluminosilicates, fly ash, preferably brown-coal fly ash and hard-coal fly ash, natural pozzolans such as tuff, trass and volcanic ash, natural and synthetic zeolites and mixtures thereof.

As used herein, the term "slag" refers to the by-product of a smelting process, or synthetic slag, The main use of a smelting process is to convert an ore, scrap or a material mixture containing different metals into a form from which the desired metals can be skimmed as a metal layer and the undesired metal oxides, e,g. silicates, alumina, etc., remain as the slag.

Blast furnace slag (BFS) is formed as a by-product during the smelting of iron ore in the blast-furnace. Other materials are granulated blast furnace slag (GBFS) and ground granulated blast furnace slag (GGBFS), which is granulated blast furnace slag that has been finely pulverized, Ground granulated blast furnace slag varies in terms of grinding fineness and grain size distribution, which depend on origin and treatment method, and grinding fineness influences reactivity here, The Blaine value is used as parameter for grinding fineness, and typically has an order of magnitude of from 200 to 1000 $m^2\ kg^{-1}$, preferably from 300 to 500 $m^2\ kg^{-1}$. Finer milling gives higher reactivity. For the purposes of the present invention, the expression "blast furnace slag" is however intended to comprise materials resulting from all of the levels of treatment, milling, and quality mentioned (i.e. BFS, GBFS and GGBFS). Blast furnace slag generally comprises from 30 to 45% by weight of CaO, about 4 to 17% by weight of MgO, about 30 to 45% by weight of $SiO_2$ and about 5 to 15% by weight of $Al_2O_3$, typically about 40% by weight of CaO, about 10% by weight of MgO, about 35% by weight of $SiO_2$ and about 12% by weight of $Al_2O_3$.

Amorphous silica is preferably an X-ray-amorphous silica, i.e. a silica for which the powder diffraction method reveals no crystallinity. The content of $SiO_2$ in the amorphous silica of the invention is advantageously at least 80% by weight, preferably at least 90% by weight. Precipitated silica is obtained on an industrial scale by way of precipitating processes starting from water glass. Precipitated silica from some production processes is also called silica gel.

Microsilica is a fine powder, mainly comprising amorphous $SiO_2$ powder and is a by-product of silicon or ferrosilicon production. The particles have a diameter of about 100 nm and a specific surface area of from about 15 to about 30 $m^2 g^{-1}$.

Fumed silica is produced via reaction of chlorosilanes, for example silicon tetrachloride, in a hydrogen/oxygen flame. Fumed silica is an amorphous $SiO_2$ powder of particle diameter from 5 to 50 nm with specific surface area of from 50 to 600 $m^2\ g^{-1}$.

Metakaolin is produced when kaolin is dehydrated. Whereas at from 100 to 200° C. kaolin releases physically bound water, at from 500 to 800° C. a dehydroxylation takes place, with collapse of the lattice structure and formation of metakaolin $(Al_2Si_2O_7)$. Accordingly, pure metakaolin comprises about 54% by weight of $SiO_2$ and about 46% by weight of $Al_2O_3$.

Aluminosilicates are minerals comprising aluminum, silicon, and oxygen, which may be expressed by referring to the $SiO_2$ and $Al_2O_3$ content. They are a major component of kaolin and other clay minerals. Andalusite, kyanite, and sillimanite are naturally occurring aluminosilicate minerals that have the composition $Al_2SiO_5$.

Fly ash is produced inter glia during the combustion of coal in power stations, and comprises fine particles of varying composition. The main ingredients of fly ash are silicon oxide, aluminum oxide, and calcium oxide. Class C fly ash (brown-coal fly ash) comprises according to WO 08/012438 about 10 wt.-% CaO, whereas class F fly ash (hard-coal fly ash) comprises less than 8% by weight, preferably less than 4% by weight, and typically about 2% by weight of CaO.

Burnt shale, especially burnt oil shale is obtained at temperatures of about 800° C. by burning of natural shale and subsequent milling.

An overview of suitable raw materials for geopolymers is found by way of example in Caijun Shi, Pavel V. Krivenko, Della Roy, Alkali Activated Cements and Concretes, Taylor & Francis, London & New York, 2006, pp. 6-63.

In a preferred embodiment, the at least one further inorganic binder is selected from the group consisting of blast furnace slag, microsilica, metakaolin, aluminosilicates, fly ash, and mixtures thereof. In a particularly preferred embodiment, the at least one further inorganic binder is selected from the group consisting of metakaolin, fly ash, and mixtures thereof.

It is preferred that the composition, the inorganic foam formulation, the inorganic foam, and the cellular material according to the present invention do not comprise an additional alkaline activator. If an alkaline activator is nevertheless added as an additive, it is preferable to select an alkaline activator from alkali metal hydroxides of the formula MOH and alkali metal silicates of the formula m $SiO_2 \times n$ $M_2O$, where M is the alkali metal, preferably Li, Na or K or a mixture thereof, and the molar ratio m:n is $\leq 4.0$, preferably $\leq 3.0$, with further preference to $\leq 2.0$, and in particular $\leq 1.70$.

The alkali metal silicate is preferably water glass, particularly preferably an aqueous water glass and in particular a sodium water glass or potassium water glass. However, it is also possible to use lithium water glass or ammonium water glass or a mixture of the water glasses mentioned. The m:n ratio stated above (also termed "modulus") should preferably not be exceeded, since otherwise reaction of the components is likely to be incomplete. It is also possible to use very much smaller moduli, for example about 0.2. Water glasses with higher moduli should be adjusted before use to moduli in the range of the invention by using a suitable aqueous alkali metal hydroxide.

The term "water glass" refers to alkali metal silicates, which are water soluble. Water glass can be obtained by the reaction of alkali metal carbonates with quartz sand (silicon dioxide). However, they can also be produced from mixtures of reactive silicas with the appropriate aqueous alkali metal hydroxides. Non-limiting examples of water glass comprise $Na_2SiO_3$, $K_2SiO_3$, and $Li_2SiO_3$. In addition to the anhydrous form, various hydrates of water glass exist as well. Typical trace impurities are based on the elements Al, Ca, Cr, Cu, Fe, Mg, and Ti. The ratio of alkali metal to silicate can vary. This ratio is defined in terms of the molar ratio of m $SiO_2$ to n $M_2O$ as mentioned above. Typical values for the ratio m n are values smaller than 4, smaller than 3, smaller than 2, or in the vicinity of 1.7.

Potassium water glasses in the advantageous modulus range are mainly marketed as aqueous solutions because they are very hygroscopic; sodium water glasses in the advantageous modulus range are also obtainable commercially as solids. The solids contents of the aqueous water glass solutions are generally from 20% by weight to 60% by weight, preferably from 40 to 60% by weight.

If an alkaline activator is used, the preferred quantity of the alkaline activator is from 1 to 55 wt.-% and in particular from 5 to 25 wt.-%.

In a preferred embodiment, the at least one inorganic binder mixture (iii) comprises at least one cement (iiic) selected from CEM I, CEM II, CEM III, CEM IV, CEM V cements, according to DIN EN 197-1 (11/2011), or calcium aluminate cement, preferably CEM I cement. The at least one cement can be present either in component (iiia), (iiib) or added separately.

Cement is an inorganic, finely milled hydraulic binder. The different types of cement are classified according to DIN EN 197-1 (11/2011) into the categories CEM I-V. These different cements vary from each other in their stability towards various corrosives and these cements therefore have different applications.

CEM I cement, also called Portland cement, contains about 70 wt.-% CaO and MgO, about 20 wt.-% $SiO_2$, about 10 wt.-% $Al_2O_3$ and $Fe_2O_3$. This cement is obtained by milling and baking limestone, chalk and clay. CEM II cement is Portland cement with a low (about 6 to about 20 wt.-%) or moderate (about 20 to about 35 wt.-%) amount of additional components. This cement may further contain blast-furnace slag, fumed silica (10 wt.-% at most), natural pozzolans, natural calcined pozzolans, fly ash, burnt shale, or mixtures thereof. CEM III cement, also called blast-furnace cement, is comprised of Portland cement that contains 36 to 85 wt.-% of slag. CEM IV cement, also called pozzolanic cement, contains next to Portland cement 11 to 65% of mixtures of pozzolans, silica fume and fly ash. CEM V cement, also called composite cement, contains next to Portland cement 18 to 50 wt.-% of slag, or mixtures of natural pozzolans, calcined pozzolans, and fly ash. Additionally, the different types of cements may contain 5 wt.-% of additional inorganic, finely milled mineral compounds.

Furthermore, various additives may be used according to the present invention. In a preferred embodiment, the at least one additive is selected from the group consisting of pH modifiers, fillers, accelerators, retarders, rheology modifiers, superplasticizers, surfactants, fibers, water-glass, further hydrophobization agents, catalysts, and mixtures thereof.

Rheology modifiers adjust the viscosity and thus the flow behavior and ensure a good balance between consistency, durability and application properties. These modifiers can be based on synthetic polymers (e.g., acrylic polymers), cellulose, silica, starches or clays.

Superplasticizers are polymers that function as dispersant to avoid particle segregation and improve the rheology and thus workability of suspensions. Superplasticizers generally can be divided into four categories: lignosulfonates, melamine sulfonates, naphthalene sulfonates, and comb polymers (e.g, polycarboxylate ethers, polyaromatic ethers, cationic copolymers, and mixtures thereof).

The setting time of the inorganic foam can be prolonged I shortened by the addition of certain compounds called retarders/accelerators, Retarders can be divided into the groups of lignosulfonates, cellulose derivatives, hydroxyl carboxylic acids, organophosphates, synthetic retarders, and inorganic compounds. Non-limiting examples of retarders are hydroxyethyl cellulose, carboxymethyl hydroxyethyl cellulose, citric acid, tartaric acid, gluconic acid, glucoheptonate, maleic anhydride, 2-Acrylamido-2-methylpropanesulfonic acid (AMPS) copolymers, borax, boric acid, and ZnO. Non-limiting examples of accelerators are $CaCl_2$, KCl, $Na_2SiO_3$, NaOH, $Ca(OH)_2$, and $CaO \times Al_2O_3$, lithium silicate, potassium silicate, and aluminum salts, such as aluminum sulfate.

Fibers (or stabilizing fibers) can be added during the foaming process to further increase the stability of the foam. Such fiber can be made of a variety of materials, such as rock (e.g. basalt), glass, carbon, organic polymers (e.g, polyethylene, polypropylene, polyacrylonitrile, polyamides, and polyvinyl alcohols), cellulose, lignocellulose, metals (e.g.

iron or steel), and mixtures thereof. Organic fibers are preferred. The amount of the fibers can be up to 3 wt.-%, preferably from 0.1 to 2 wt.-%, more preferably 0.1 to 1.5 wt.-% and in particular 0.2 to 1 wt.-%, based on the at least one inorganic binder mixture. The fibers preferably have a length of up to 200 mm or up to 120 mm, preferably up to 100 mm, more preferably up to 50 mm, most preferably up to 25 mm and in particular up to 20 mm, and a diameter of up to 100 μm.

The term "filler" refers primarily to materials that can be added to increase the volume without impairing the properties of the foam. The fillers mentioned can be selected from the group consisting of quartz sand or powdered quartz, calcium carbonate, rock flour, low-density fillers (for example vermiculite, perlite, diatomaceous earth, mica, talc powder, magnesium oxide, foamed glass, hollow spheres, foam sand, clay, polymer particles), pigments (e.g. titanium dioxide), high density fillers (e.g. barium sulphate), metal salts (e.g, zinc salts, calcium salts, etc.), and mixtures thereof. Grain sizes suitable here are in particular up to 500 pm. It is particularly preferable that the average grain size is up to 300 pm, preferably up to 150 μm.

Surfactants, which may be used in addition to the amphiphilic compounds as defined herein, include non-ionic surfactants, anionic surfactants, cationic surfactants, zwitterionic surfactants and proteins or synthetic polymers. However, surfactants are not preferred as they tend to yield open-cell foams.

Non-ionic surfactants include fatty alcohols, cetyl alcohol, stearyl alcohol, and cetostearyl alcohol (comprising predominantly cetyl and stearyl alcohols), and oleyl alcohol, Further examples include polyethylene glycol alkyl ethers (Brij) $CH_3—(CH_2)_{10-16}—(O—C_2H_4)_{1-25}—OH$ such as octaethylene glycol monododecyl ether or pentaethylene glycol monododecyl ether; polypropylene glycol alkyl ethers $CH_3—(CH_2)_{10-16}—(O—C_3H_6)_{10-25}—OH$; glucoside alkyl ethers $CH_3—(CH_2)_{10-16}—(O-Glucoside)_{1-3}—OH$ such as decyl glucoside, lauryl glucoside, octyl glucoside; polyethylene glycol octylphenyl ethers $C_8H_{17}—(O_6H_4)—(O—C_2H_4)_{1-25}—OH$ such as Triton X-100; polyethylene glycol alkylphenyl ethers $C_9H_{19}—(C_6H_4)—(O—C_2H_4)_{1-25}—OH$ such as nonoxynol-9; glycerol alkyl esters such as glyceryl laurate; polyoxyethylene glycol sorbitan alkyl esters such as polysorbate; sorbitan alkyl esters such as spans; cocamide MEA, cocamide DEA; dodecyldimethylamine oxide; block copolymers of polyethylene glycol and polypropylene glycol such as poloxamers; polyethoxylated tallow amine (POEA). Preferred non-ionic surfactants also include alkyl polyglucosides. Alkyl polyglucosides generally have the formula $H—(C_6H_{10}O_5)_m—O—R^1$, where $(C_6H_{10}O_5)$ is a glucose unit and $R^1$ is a $C_6$-$C_{22}$-alkyl group, preferably a $C_8$-$C_{16}$-alkyl group and in particular a $C_8$-$C_{12}$-alkyl group, and m=from 1 to 5.

Anionic surfactants contain anionic functional groups at their head, such as sulfate, sulfonate, phosphate, and carboxylates. Prominent alkyl sulfates include ammonium lauryl sulfate, sodium lauryl sulfate (sodium dodecyl sulfate, SLS, or SDS), and the related alkyl-ether sulfates sodium laureth sulfate (sodium lauryl ether sulfate or SLES), and sodium myreth sulfate. Others include docusate (dioctyl sodium sulfosuccinate), perfluorooctanesulfonate (PFOS), perfluorobutanesulfonate, alkyl-aryl ether phosphates, alkyl ether phosphates. Preferred carboxylates include the alkyl carboxylates, such as sodium stearate. More specialized species include sodium lauroyl sarcosinate and carboxylate-based fluorosurfactants such as perfluorononanoate, perfluorooctanoate (PFOA or PFO).

Cationic surfactants include, dependent on the pH, primary, secondary, or tertiary amines: Primary and secondary amines become positively charged at pH<10. An example is octenidine dihydrochloride. Furthermore, cationic surfactants include permanently charged quaternary ammonium salts, such as cetrimonium bromide (CTAB), cetylpyridinium chloride (CPC), benzalkonium chloride (BAC), benzethonium chloride (BZT), dimethyldioctadecylammonium chloride, dioctadecyldimethylammonium bromide (DODAB).

Zwitterionic (amphoteric) surfactants have both cationic and anionic centers attached to the same molecule. The cationic part is based on primary, secondary, or tertiary amines or quaternary ammonium cations. The anionic part can be more variable and include sulfonates, as in the sultaines CHAPS (3-[(3-Cholamidopropyl)dimethylammonio]-1-propanesulfonate) and cocamidopropyl hydroxysultaine. Betaines such as cocamidopropyl betaine have a carboxylate with the ammonium. The most common biological zwitterionic surfactants have a phosphate anion with an amine or ammonium, such as the phospholipids phosphatidylserine, phosphatidylethanolarnine, phosphatidylcholine, and sphingomyelins, Non-limiting examples of proteins are bovine serum albumin, egg ovalbumin, milk caseins or beta-lactoglobulin.

The proportion of the surfactant can vary over a broad range. The surfactant may be present in an amount of up to 2.5 wt.-%, preferably up to 1.5 wt.-%, Waterglass may function as alkaline activator as explained above. The term "waterglass" has also been defined above.

Catalysts that may be used as additives are catalysts that may be used in combination with a blowing agent for foaming. Suitable catalysts are mentioned above and below in the context of blowing agents.

Further details regarding the amounts of the components as used according to the present invention are defined hereinafter.

As mentioned above, the amounts of the components according to the present invention are preferably as follows. In particular, the amount of amphiphilic compound to inorganic particle surface is from 0.5 to 160 μmol/m²; and/or the inorganic particles are provided in an amount of from 0.1 to 25 wt.-% with regard to the amount of the at least one inorganic binder mixture; and/or the weight ratio of water to dry inorganic binder mixture is from 0.1 to 2.0.

In one exemplary embodiment, the amount of amphiphilic compound to inorganic particle surface is from 10 to 140 pmol/m², preferably from 20 to 120 μmol/m²; and/or the inorganic particles are provided in an amount of from 0.25 to 15 wt.-%, with regard to the amount of the at least one inorganic binder mixture; and/or the weight ratio of water to the inorganic binder mixture is from 0.2 to 1.5.

As explained above, it is to be understood that at least one group, i.e. one or more groups, of inorganic particles and at least one member, i.e. one or more members, of amphiphilic compounds may be used. The above amounts refer to the overall amount of amphiphilic compounds and inorganic particles, respectively, being used in the process of the invention or being present in the composition, the inorganic foam or the cellular material of the invention. Furthermore, the above amount in relation to the inorganic binder mixture refers to the overall amount of inorganic binders being used in the process of the invention or being present in the composition, the inorganic foam or the cellular material of the invention.

If the at least one inorganic binder mixture comprises
(iiia) at least one calcium sulfoaluminate mixture, and
(iiib) at least one further inorganic binder selected from the group consisting of hydraulic binders, latent hydraulic binders, pozzolanic binders, and mixtures thereof, the components (iiib) and (iiia) may be present in a relative weight ratio of from 0.1 to 3.4, preferably 0.1 to 2.0, more preferably 0.3 to 1.5.

Suitable amounts of the additives may vary over a broad range and also depend on the type of additive, Typically, the at least one additive is provided in weight ratio of from 0.0003 to 30 wt.-%, or of from 0.03 to 25 wt.-%, based on the amount of the at least one inorganic binder. However, fillers may also be used in higher amounts. In particular, the filler may be present in similar amounts as the inorganic binder. Preferably, the weight ratio of filler to at least one inorganic binder mixture may be from 2:1 to 1:100, preferably from 1:1 to 1:10.

Further details regarding the process of the invention are provided hereinafter.

In a preferred embodiment of the process of the invention, step (1) comprises the steps of
(1a) dispersing the at least one group of inorganic particles, the at least one amphiphilic compound in water to obtain an aqueous dispersion, and optionally the at least one additive; and
(1b) mixing the aqueous dispersion with the at least one inorganic binder mixture.

It is to be understood that, preferably, in step (1a) the at least one group of inorganic particles, the at least one amphiphilic compound, and optionally the at least one additive are first combined with each other and the resulting mixture is then dispersed in water.

In a preferred embodiment, the inorganic foam formulation obtained in step (1) of the process of the invention has a pH-value below 12, which is an important advantage of the present invention in view of the safety, handling and compatibility with commonly used additives.

In a preferred embodiment of the process of the invention, step (2) comprises foaming the resulting foam formulation by chemical foaming. In another preferred embodiment of the process of the invention, step (2) comprises foaming the resulting foam formulation by physical foaming. In yet another preferred embodiment of the process of the invention, step (2) comprises foaming the resulting foam formulation by mechanical foaming.

In a preferred embodiment, step (2) of the process for preparing an inorganic foam comprises foaming the resulting foam formulation with a blowing agent, preferably by mixing the foam formulation obtained in step (1) with carbonates or bicarbonates, such as $CaCO_3$, $Na_2CO_3$, and $NaHCO_3$, aluminium powder, p-toluenesulfonylhydrazide, hydrogen peroxide, dibenzylperoxide, perchloric acid, peroxomonosulfuric acid, dicumyl peroxide, cumyl hydroperoxide or mixtures thereof, more preferably hydrogen peroxide. In a more preferred embodiment, foaming of the foam formulation in step (2) is performed with a blowing agent, preferably by mixing the foam formulation obtained in step (1) with aluminum powder or with a carbonate in the presence of an acid or with an aqueous solution of hydrogen peroxide, optionally in the presence of a catalyst.

In a more preferred embodiment, step (2) of the process for preparing an inorganic foam comprises foaming the resulting foam formulation with a blowing agent, preferably a blowing agent as defined above, wherein the blowing agent is added in an amount of from 0.1 to 10 wt.-%, based on the total amount of the foam formulation.

It is possible to accelerate the foaming process, in particular foaming with a peroxide as blowing agent, by the addition of a suitable catalyst. In a preferred embodiment, step (2) of the process for preparing an inorganic foam therefore comprises foaming the resulting foam formulation with a chemical blowing agent in the presence of a catalyst, wherein preferably the catalyst comprises $Mn^{2+}$, $Mn^{4+}$, $Mn^{7+}$ or $Fe^{3+}$ cations, or the catalyst is the enzyme catalase. More preferably, the catalyst is selected from the group consisting of $MnSO_4$, $MnO_2$, $KMnO_4$, and mixtures thereof. The catalyst may be used in an amount of from 0.01 to 5 wt.-%, preferably from 0.01 to 2 wt.-%, more preferably from 0.05 to 1.0 wt.-% and in particular from 0.1 to 0.6 wt.-%, based on to total amount of foam formulation.

In a preferred embodiment, the chemical blowing agent is hydrogen peroxide provided as an aqueous hydrogen peroxide solution comprising from 10 to 60 wt.-%, preferably from 20 to 60 wt.-% and in particular from 40 to 60 wt.-% hydrogen peroxide, wherein the aqueous hydrogen peroxide solution is added in an amount of from 0.1 to 6 wt.-%, preferably from 0.5 to 5.0 wt.-% and in particular from 1 to 4 wt.-% based on the total weight of the foam formulation, assuming an about 50 wt.-% hydrogen peroxide solution.

In another preferred embodiment, mechanical foaming is performed, preferably by using a mixer, or by an oscillating process, or by a stator-rotor process.

After the foaming step (2), the inorganic foam according to the invention is obtained.

In a preferred embodiment, the freshly prepared inorganic foam is allowed to harden in a sealed container after step 2). In a more preferred embodiment, the freshly prepared inorganic foam is allowed to harden for at least 12 h in a sealed container after step 2). Hardening can be performed at a temperature in the range of from 0° C. to 100° C., preferably 20° C. to 80° C.

A cellular material is obtained by hardening, and optionally drying the above mentioned inorganic foam. The cellular material according to the present invention may be in the form of a heat insulation element, an acoustic absorption element or a fire protection element, wherein the element may in each case, e.g., be a sheet or board.

The inorganic foams and cellular materials according to the invention have a mostly closed-cell structure and the following advantageous features.

The dry density is typically below 300 kg/m$^3$, suitably below 200 kg/m$^3$, preferably below 150 kg/m$^3$ and more preferably below 100 kg/m$^3$. In particular, the dry density can be even further reduced to below 100 kg/m$^3$, preferably below 90 kg/m$^3$, if the at least one inorganic binder mixture not only comprises the at least one calcium sulfoaluminate mixture, but also the at least one further inorganic binder selected from the group consisting of hydraulic binders, latent hydraulic binders, pozzolanic binders, and mixtures thereof. It is advantageous that the dry density is lower than the dry density of surfactant-stabilized geopolymer foams and cellular materials on the basis thereof.

The thermal conductivity (DIN EN 12667) is preferably below 50 mW/mK, more preferably below 45 mW/mK and in particular below 40 mW/mK. In general, the thermal conductivity is even better than the thermal conductivity of surfactant-stabilized geopolymer foams and cellular materials on the basis thereof.

The compressive strength (DIN EN 826) is preferably at least 30 kPa. In general, the compressive strength is comparable to the compressive strength of surfactant-stabilized geopolymer foams and cellular materials on the basis thereof. As a matter of fact, due to the lower dry density, the ratio of compressive strength to dry density is improved.

The air flow resistance (DIN EN 29 053) is preferably at least 1000 kPa s/m², more preferably at least 1500 kPa s/m², most preferably at least 1800 kPa s/m². In particular, the air flow resistance can be even further increased to at least 2000 kPa s/m², if the at least one inorganic binder mixture not only comprises the at least one calcium sulfoaluminate mixture, but also the at least one further inorganic binder selected from the group consisting of hydraulic binders, latent hydraulic binders, pozzolanic binders, and mixtures thereof. It is advantageous that the air flow resistance is significantly higher than the air flow resistance of surfactant-stabilized geopolymer foams and cellular materials on the basis thereof, which typically have an air flow resistance below 200 kPa s/m² or even below 50 kPa s/m².

The present invention is further illustrated by the following examples.

EXAMPLES

Comparative Example 1

A geopolymer foam was prepared from the following composition of raw materials in weight percent:
- 20.5% Metakaolin (Argical™ M 1200S, Imerys)
- 20.5% Fly ash (Microsit® M10, BauMineral)
- 7.8% Calcium aluminate cement (Ciment Fondu®, Kerneos)
- 1.2% Surfactant (Alkyl Polyglucoside, Glucopon®, 225 DK, BASF)
- 0.2% PAN Fibers (6 mm, 6.7 dtex)
- 19.5% Water
- 27.4% Waterglass ("Kaliwasserglass K58", BASF)
- 2.9% NaOH The liquid raw materials were first mixed with NaOH. The solid raw materials were added to the liquid components and stirred until a homogeneous slurry is created. The foam was then generated with a kitchen mixer. The so obtained foam was poured to a mold. The setting reaction took place and the foam started to solidify. The geopolymer foam was stored in humid atmosphere for 3 days to allow proper setting. Thereafter, it was demolded and dried at 70° C. until constant mass.

The resulting geopolymer foam part exhibited a dimension of 300 mm×300 mm×40 mm. Its dry density was 144 kg/m³ and its thermal conductivity 42.1 mW/mK. The compressive strength was 48 kPa, the flexural strength was 28 kPa. The sample featured an air flow resistivity (DIN EN 29 053) of 4.2 kPa s/m². The foam exhibited mainly open pores as shown in FIG. 1.

Comparative Example 2

A mixture comprising 79.8 wt.-% calcium carbonate (Socal 31), 15.1 wt.-% butyl gallate and 5.1 wt.-% manganese (IV) oxide was premixed as "Foam Formation Powder".

A geopolymer foam was prepared from the following composition of raw materials in weight percent:
- 19.2% Metakaolin (Argical™ M 1200S, Imerys)
- 19.2% Fly ash (Microsit® M10, BauMineral)
- 7.3% Calcium aluminate cement (Ciment Fondu®, Kerneos)
- 2.3% Foam Formation Powder
- 0.2% PAN Fibers (6 mm, 6.7 dtex)
- 23.4% Water
- 26.3 Waterglass ("Kaliwasserglass K58", BASF)
- 2.8% Hydrogen Peroxide (50% solution)

The foam formation powder was first dispersed in water. Then, the suspension was added to the waterglass. The mix of metakaolin and fly ash was added and the suspension was stirred for 10 min. Subsequently, the calcium aluminate cement was admixed. After 15 min of stirring, the foaming of the suspension was initiated by adding the hydrogen peroxide. The so obtained slurry was poured to a mold where the foam expansion evolves until the decomposition of the hydrogen peroxide was completed. The prepared wet foam was stable until after about 30 min the setting reaction took place and the foam started to solidify. The geopolymer foam was stored in humid atmosphere for 3 days to allow proper setting. Thereafter, it was demolded and dried at 70° C. until constant mass.

The resulting geopolymer foam part exhibited a dimension of 200 mm×200 mm×50 mm. Its dry density was 127 kg/m³ and its thermal conductivity 39.6 mW/mK. The sample featured an air flow resistivity of 233 kPa s/m². The foam exhibited mainly closed pores. A picture of the foam is provided in FIG. 2.

Working Example 1

A mixture comprising 88.5 wt.-% calcium carbonate (Schafer Precarb 100), 5.8 wt.-% enanthic acid and 5.7 wt.-% manganese (IV) oxide was premixed as "Foam Formation Powder".

A calcium sulfoaluminate foam was prepared from the following composition of raw materials in weight percent:
- 39.4% Calcium Sulfoaluminate (Alipre®, ltalcementi)
- 12.2% Calcium Sulfate Dihydrate
- 6.5 Foam Formation Powder
- 0.3 PAN Fibers (6 mm, 6.7 dtex)
- 38.7% Water
- 2.9% Hydrogen Peroxide (50% solution)

The foam formation powder was first dispersed in water. Then, the mix of calcium sulfoaluminate and calcium sulfate dihydrate was admixed. After 15 min of stirring, the foaming of the suspension was initiated by adding the hydrogen peroxide. The so obtained slurry was poured to a mold where the foam expansion evolved until the decomposition of the hydrogen peroxide was completed. The prepared wet foam was stable until after about 15 min the setting reaction took place and the foam started to solidify. The calcium sulfoaluminate foam was stored in humid atmosphere over night to allow proper setting. Thereafter, it was demolded and dried at 70° C. until constant mass.

The resulting calcium sulfoaluminate foam part exhibited a dimension of 240 mm×480 mm×100 mm. Its dry density was 111 kg/m³ and its thermal conductivity 42.1 mW/mK. The compressive strength was 48 kPa. The sample featured an air flow resistivity of 1990 kPa s/m². The foam exhibited closed pores as shown in FIG. 3.

Working Example 2

A mixture comprising 83.7 wt.-% calcium carbonate (Schafer Precarb 100), 5.5 wt.-% enanthic acid and 10.8 wt.-% manganese (IV) oxide was premixed as "Foam Formation Powder".

A calcium sulfoaluminate foam was prepared from the following composition of raw materials in weight percent:
- 18.7% Calcium Sulfoaluminate (Alipre®, ltalcementi)
- 5.8% Calcium Sulfate Dihydrate
- 12.2% Metakaolin (Argical™ M 1200S, lmerys)
- 12.2% Fly Ash (Microsit® M10, BauMineral)
- 3.7% Foam Formation Powder
- 0.2% PAN Fibers (6 mm, 6.7 dtex)
- 43.9% Water
- 3.2% Hydrogen Peroxide (50% solution)

The foam formation powder was first dispersed in water. Then, the mix of calcium sulfoaluminate, calcium sulfate dihydrate, metakaolin and fly ash was admixed. After 15 min of stirring, the foaming of the suspension was initiated by adding the hydrogen peroxide. The so obtained slurry was poured to a mold where the foam expansion evolved until the decomposition of the hydrogen peroxide was completed. The prepared wet foam was stable until after about 15 min the setting reaction took place and the foam started to solidify. The calcium sulfoaluminate foam was stored in humid atmosphere for 3 days to allow proper setting. Thereafter, it was demolded and dried at 70° C. until constant mass.

The resulting calcium sulfoaluminate foam part exhibited a dimension of 240 mm×480 mm×100 mm. Its dry density was 83 kg/m$^3$ and its thermal conductivity 36.4mW/mK. The compressive strength was 43 kPa, the flexural strength was 28 kPa. The sample featured an air flow resistivity of 2220 kPa s/m$^2$. The foam exhibited closed pores as shown in FIG. 4.

The invention claimed is:

1. A process for preparing an inorganic foam comprising the steps of
   (1) mixing
      (i) at least one group of inorganic particles;
      (ii) at least one amphiphilic compound;
      (iii) at least one inorganic binder mixture comprising
         (iiia) at least one calcium sulfoaluminate mixture, and optionally
         (iiib) at least one further inorganic binder selected from the group consisting of hydraulic binders, latent hydraulic binders, pozzolanic binders, and mixtures thereof;
      (iv) water; and optionally
      (v) at least one additive; and
   (2) foaming the resulting foam formulation by chemical, physical or mechanical foaming; wherein the at least one calcium sulfoaluminate mixture contains a) ye'elimite (4CaO×3Al$_2$O$_3$×SO$_3$) and optionally belite (2CaO×SiO$_2$) and b) anhydrite (CaSO$_4$), calcium sulfate hemihydrate (CaSO$_4$×0.5H$_2$O) and/or gypsum (CaSO$_4$×2H$_2$O), in a weight ratio of a):b) of from 90:10 to 60:40.

2. The process according to claim 1, wherein the at least one group of inorganic particles is selected from the group consisting of oxides, hydroxides, carbides, nitrides, phosphates, carbonates, silicates, sulfates, and mixtures thereof.

3. The process according to claim 1, wherein the at least one group of inorganic particles is selected from the group consisting of silica particles, alumina particles, zirconia particles, CaCO$_3$ particles, and mixtures thereof.

4. The process according to claim 1, wherein the at least one group of inorganic particles has a median particle size D$_{50}$ in the range of from 30 nm to 300 μm.

5. The process according to claim 1, wherein the at least one amphiphilic compound comprises amphiphilic compounds with at least one polar head group and at least one apolar tail group,
   wherein the at least one head group is selected from the group consisting of phosphates, phophonates, sulfates, sulfonates, alcohols, amines, amides, pyrrolidines, gallates, and carboxylic acids;
   and wherein the at least one tail group is selected from an aliphatic or an aromatic or a cyclic group with 2 to 8 carbon atoms, wherein the carbon atoms are optionally substituted with one or more, same or different substituents selected from C$_1$-C$_8$-alkyl, secondary —OH, and secondary —NH$_2$.

6. The process according to claim 1, wherein the at least one amphiphilic compound comprises amphiphilic compounds with at least one head group selected from the group consisting of carboxylic acids, gallates and amines, and at least one tail group selected from aliphatic groups with 2 to 8 carbon atoms.

7. The process according to claim 1, wherein the at least one calcium sulfoaluminate mixture has the analytical oxide composition of 5 to 35 wt.-% of SO$_3$, 30 to 60 wt.-% of CaO, 0 to 30 wt.-% of SiO$_2$ and 5 to 35 wt.-% of Al$_2$O$_3$.

8. The process according to claim 1, wherein the at least one further inorganic binder is selected from the group consisting of blast furnace slag, microsilica, metakaolin, aluminosilicates, fly ash, and mixtures thereof.

9. The process according to claim 1, wherein the at least one further inorganic binder is a mixture of metakaolin and fly ash.

10. The process according to claim 1, wherein the at least one inorganic binder mixture (iii) comprises
    (iiic) at least one cement selected from CEM I, CEM II, CEM III, CEM IV, CEM V cements, according to DIN EN 197-1 (11/2011), or calcium aluminate cement.

11. The process according to claim 1, wherein the at least one additive is selected from the group consisting of pH modifiers, fillers, accelerators, retarders, rheology modifiers, superplasticizers, surfactants, fibers, waterglass, further hydrophobization agents, catalysts, and mixtures thereof.

12. The process according to claim 1, wherein the amount of amphiphilic compound to inorganic particle surface is from 0.5 to 160 μmol/m2; and/or
    wherein the inorganic particles are provided in an amount of from 0.1 to 25 wt.-% with regard to the amount of the at least one inorganic binder mixture; and/or
    wherein the weight ratio of water to the inorganic binder mixture is from 0.1 to 2.0.

13. The process according to claim 1, wherein step (1) comprises the steps of (1a) dispersing the at least one group of inorganic particles, the at least one amphiphilic compound, and optionally the at least one additive in water to obtain an aqueous dispersion; and
    (1b) mixing the aqueous dispersion with the at least one inorganic binder mixture.

14. An inorganic foam obtained by the process according to claim 1.

15. A cellular material obtained by hardening and optionally drying an inorganic foam according to claim 14.

16. An inorganic foam comprising
    (i) at least one group of inorganic particles;
    (ii) at least one amphiphilic compound;
    (iii) at least one inorganic binder mixture comprising
       (iiia) at least one calcium sulfoaluminate mixture, and optionally (iiib) at least one further inorganic binder selected from the group consisting of hydraulic binders, latent hydraulic binders, pozzolanic binders, and mixtures thereof;
(iv) water; and optionally
(v) at least one additive;
wherein the at least one calcium sulfoaluminate mixture contains a) ye'elimite ($4CaO \times 3Al_2O_3 \times SO_3$) and optionally belite ($2CaO \times SiO_2$) and b) anhydrite ($CaSO_4$), calcium sulfate hemihydrate ($CaSO_4 \times 0.5H_2O$) and/or gypsum ($CaSO_4 \times 2H_2O$), in a weight ratio of a):b) of from 90:10 to 60:40.

17. The process according to claim 1, wherein the at least one inorganic binder mixture (iii) comprises CEM I cement, according to DIN EN 197-1 (11/2011).

18. A cellular material obtained by hardening and optionally drying an inorganic foam according to claim 16.

19. A composition for preparing an inorganic foam formulation comprising as components
(i) at least one group of inorganic particles;
(ii) at least one amphiphilic compound;
(iii) at least one inorganic binder mixture comprising
(iiia) at least one calcium sulfoaluminate mixture, and optionally
(iiib) at least one further inorganic binder selected from the group consisting of hydraulic binders, latent hydraulic binders, pozzolanic binders, and mixtures thereof;
wherein
the components (i), (ii), and (iii) are present separately; or
the components (i) and (ii) are present as a mixture and the component (iii) is present separately; or
the components (i), (ii) and (iii) are present as a mixture;
wherein the at least one calcium sulfoaluminate mixture contains a) ye'elimite ($4CaO \times 3Al_2O_3 \times SO_3$) and optionally belite ($2CaO \times SiO_2$) and b) anhydrite ($CaSO_4$), calcium sulfate hemihydrate ($CaSO_4 \times 0.5H_2O$) and/or gypsum ($CaSO_4 \times 2H_2O$), in a weight ratio of a):b) of from 90:10 to 60:40.

20. A process for preparing an inorganic foam comprising the steps of
(1) mixing
(i) at least one group of inorganic particles;
(ii) at least one amphiphilic compound;
(iii) at least one inorganic binder mixture comprising
(iiia) at least one calcium sulfoaluminate mixture, and optionally
(iiib) at least one further inorganic binder selected from the group consisting of hydraulic binders, latent hydraulic binders, pozzolanic binders, and mixtures thereof;
(iv) water; and optionally
(v) at least one additive; and
(2) foaming the resulting foam formulation by chemical, physical or mechanical foaming;
wherein the at least one further inorganic binder is a mixture of metakaolin and fly ash.

21. A process for preparing an inorganic foam comprising the steps of
(1) mixing
(i) at least one group of inorganic particles;
(ii) at least one amphiphilic compound;
(iii) at least one inorganic binder mixture comprising
(iiia) at least one calcium sulfoaluminate mixture, and optionally
(iiib) at least one further inorganic binder selected from the group consisting of hydraulic binders, latent hydraulic binders, pozzolanic binders, and mixtures thereof;
(iv) water; and optionally
(v) at least one additive; and
(2) foaming the resulting foam formulation by chemical, physical or mechanical foaming;
wherein the at least one inorganic binder mixture (iii) comprises
(iiic) at least one cement selected from CEM I, CEM II, CEM III, CEM IV, CEM V cements, according to DIN EN 197-1 (11/2011), or calcium aluminate cement.

22. A process for preparing an inorganic foam comprising the steps of
(1) mixing
(i) at least one group of inorganic particles;
(ii) at least one amphiphilic compound;
(iii) at least one inorganic binder mixture comprising
(iiia) at least one calcium sulfoaluminate mixture, and optionally
(iiib) at least one further inorganic binder selected from the group consisting of hydraulic binders, latent hydraulic binders, pozzolanic binders, and mixtures thereof;
(iv) water; and optionally
(v) at least one additive; and
(2) foaming the resulting foam formulation by chemical, physical or mechanical foaming;
wherein step (1) comprises the steps of
(1a) dispersing the at least one group of inorganic particles, the at least one amphiphilic compound, and optionally the at least one additive in water to obtain an aqueous dispersion; and
(1b) mixing the aqueous dispersion with the at least one inorganic binder mixture.

* * * * *